United States Patent
Ide et al.

(10) Patent No.: US 6,724,107 B1
(45) Date of Patent: Apr. 20, 2004

(54) DYNAMO-ELECTRIC MACHINE

(75) Inventors: Kazumasa Ide, Hitachiohta (JP); Kenichi Hattori, Hitachi (JP); Akiyoshi Komura, Hitachi (JP); Mitsunori Yamashina, deceased, late of Hitachi (JP), by Yoko Yamashina, heiress; Tadashi Sonobe, Iwaki (JP); Akitomi Semba, Hitachi (JP); Junji Sato, Hitachi (JP); Ryoichi Shiobara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/509,768

(22) PCT Filed: Sep. 3, 1999

(86) PCT No.: PCT/JP99/04790

§ 371 (c)(1),
(2), (4) Date: Mar. 31, 2000

(87) PCT Pub. No.: WO01/18943

PCT Pub. Date: Mar. 15, 2001

(51) Int. Cl.[7] .................................................. H02K 9/00
(52) U.S. Cl. .......................................... 310/55; 310/57
(58) Field of Search ................................ 310/52, 54, 55, 310/57, 58, 59

(56) References Cited

U.S. PATENT DOCUMENTS

| | | | |
|---|---|---|---|
| 3,348,081 A | * 10/1967 | Willyoung | 310/55 |
| 4,182,966 A | 1/1980 | Mishra et al. | 310/59 |
| 4,264,834 A | 4/1981 | Armor et al. | 310/59 |
| 4,347,451 A | 8/1982 | Mizuyama et al. | 310/59 |
| 4,467,229 A | 8/1984 | Ogita | 310/60 A |
| 5,883,448 A | 3/1999 | Zimmerman | 310/52 |
| 6,097,116 A | 8/2000 | Hess et al. | 320/61 |
| 6,201,323 B1 | 3/2001 | Semba et al. | 310/52 |
| 6,262,501 B1 | 7/2001 | Semba et al. | 310/52 |
| 6,262,502 B1 | 7/2001 | Semba et al. | 310/52 |
| 6,265,795 B1 | 7/2001 | Semba et al. | 310/52 |
| 6,288,461 B1 | 9/2001 | Mori et al. | 310/58 |
| 6,316,852 B1 | 11/2001 | Semba et al. | 310/61 |
| 6,359,351 B1 | 3/2002 | Semba et al. | 310/52 |
| 6,359,361 B1 | 3/2002 | Wakui et al. | 310/179 |
| 6,392,320 B1 | 5/2002 | Glahn et al. | 310/52 |

FOREIGN PATENT DOCUMENTS

| | | |
|---|---|---|
| DE | 197 36 785 A1 | 2/1999 |
| EP | 1 005 139 A2 | 5/2000 |
| GB | 921126 | 3/1963 |
| JP | 58151845 A | 9/1983 |
| JP | 60-162432 | 8/1985 |
| JP | 02136050 A | 5/1990 |
| JP | 04351439 A | 12/1992 |
| JP | 10-150740 | 6/1998 |
| JP | 11122872 | 4/1999 |

* cited by examiner

Primary Examiner—Dang Le
(74) Attorney, Agent, or Firm—Antonelli, Terry, Stout & Kraus, LLP

(57) ABSTRACT

A rotating electric machine exhibits a substantially level axial temperature rise distribution by supplying a coolant which is sufficiently cooled to a central portion of an iron core which is most distant from each of the axial ends of the iron core. A plurality of ventilating passages, which continuously extend in the peripheral direction, are provided in the axial direction between a stator frame and a stator iron core, and coolers are provided in the ventilating passages. A coolant boosted by a booster is cooled by the coolers and is allowed to flow to a central portion of the stator iron core in the direction from the outer peripheral side to the inner peripheral side of the stator iron core via ventilating passages which communicate with the central portion of the stator iron core.

6 Claims, 11 Drawing Sheets

DYNAMO-ELECTRIC MACHINE

TECHNICAL FIELD

The present invention relates to a rotating electric machine in which a cooler for cooling a coolant is provided, as well as to a method of cooling a rotating electric vehicle.

BACKGROUND OF THE INVENTION

A rotating electric machine in which a cooler for cooling a coolant is provided has been described, for example, in Japanese Patent Laid-open Nos. Hei 7-177705 and Hei 10-146022. The rotating electric machine described in these documents is configured such that a space between a stator frame and a stator iron core is partitioned into a low temperature gas chamber, to which a coolant at a low temperature is supplied, and a high temperature gas chamber, in which the heated coolant flows. A plurality of coolers distributed in the axial direction are provided in a foundation pit under the rotating electric machine, whereby the coolant cooled by the plurality of coolers and boosted by a ventilating fan is introduced to various heat sources, such as the iron core and the coils, via the low temperature gas chamber, and the coolant which has been used for cooling the heat sources is returned to the coolers via the high temperature gas chamber.

The above-described rotating electric machine, however, has a problem. Since the coolant which has passed through one or two or more of the heat sources is then introduced to a central portion of the iron core, the temperature of the coolant is raised before the coolant reaches the central portion of the iron core. Accordingly, for the above-described rotating electric machine, if a thermal load generated from the heat sources, such as the iron core and coils, becomes large with an increase in the generation capacity or in the loss density, the cooling effect of the coolant introduced to the central portion of the iron core is significantly degraded. As a result, in the above-described rotating electric machine, there is a possibility that local heat generation will occur in a gap between the stator iron core and a rotor iron core, thereby to increase the thermal oscillation stroke of the rotor due to uneven thermal expansion of the rotor in the axial direction.

To solve the above-described problem, there may be considered a method of increasing the amount of the coolant or optimizing the distribution of the amounts of the coolant components supplied to respective ventilating passages by adjusting the ventilating resistance; however, according to the former method, the ventilation loss of the coolant caused upon boosting the coolant by the fan becomes larger, to increase the total loss in the coolant; and, according to the latter method, since the ventilation resistance must be adjusted while the desired electric and mechanical characteristics are satisfied in a limited space, it is difficult to optimize the distribution of the coolant components supplied to the respective ventilating passages.

SUMMARY OF THE INVENTION

An object of the present invention is to provide a rotating electric machine which is capable of exhibiting a level axial temperature rise distribution, and a cooling method thereof.

The basic feature of the present invention is to supply a coolant, which is sufficiently cooled, to a central portion of an iron core which is most distant from both axial ends of the iron core. To realize this feature of the present invention, a plurality of ventilating passages, which continuously extend in the peripheral direction, are provided in the axial direction between a stator frame and a stator iron core, and coolers are provided in at least those passages, which communicate with the central portion of the iron core, of the plurality of ventilating passages formed in the axial direction, wherein the coolant boosted by a booster is cooled by the coolers and is allowed to flow to the central portion of the iron core in the direction from the outer peripheral side to the inner peripheral side of the iron core via the ventilating passages.

If an even number of ventilating passages are provided, two to four of the ventilating passages, which are located on the central side, constitute the ventilating passages which communicate with the central portion of the iron core. If an odd number of ventilating passages are provided, one to three of the ventilating passages, which are located on the central side, constitute the ventilating passages which communicate with the central portion of the iron core. The number of the ventilating passages is dependent on the capacity of the rotating electric machine. For example, for a generator having a generation capacity of 100 MW class, at least three ventilating passages are provided, and for a generator having a generation capacity of 350 MW class or more, seven to ten or more ventilating passages are provided.

According to the above feature of the present invention, it is possible to level the axial temperature rise distribution in the machine. In particular, the above feature is effective in a rotating electric machine in which the axial length is long and air is used as a coolant, for example, an air-cooled generator having a large capacity. Air which is larger in viscosity than hydrogen exhibits a high ventilating resistance when it flows in a generator, to thereby cause a temperature rise. The longer the ventilating distance of air, the larger the ventilating resistance will be. As a result, for a generator which is longer in axial length and larger in capacity, the temperature rise of the air becomes significantly larger, and the amount of the air supplied to the central portion of an iron core becomes smaller.

Accordingly, a small amount of air whose temperature is raised is supplied to the central portion of the iron core which is most distant from both the axial ends of the iron core, with a result that there occurs a difference in temperature between each of the axial ends of the iron core and the central portion of the iron core. According to the present invention, it is possible to supply a coolant which is sufficiently cooled to the central portion of the iron core, however, it is also possible to suppress the temperature rise of the central portion of the iron core to an allowable value or less, and, hence, to level the axial temperature rise distribution in the machine.

The leveling of the axial temperature rise distribution in the machine means that the temperature rise of the central portion of the iron core is suppressed to an allowable value or less, to reduce the difference in temperature between each of the axial ends of the iron core and the central portion of the iron core. Accordingly, there is no variation in the axial temperature rise distribution in the machine.

BEST MODE FOR CARRYING OUT THE INVENTION

Figure 1:
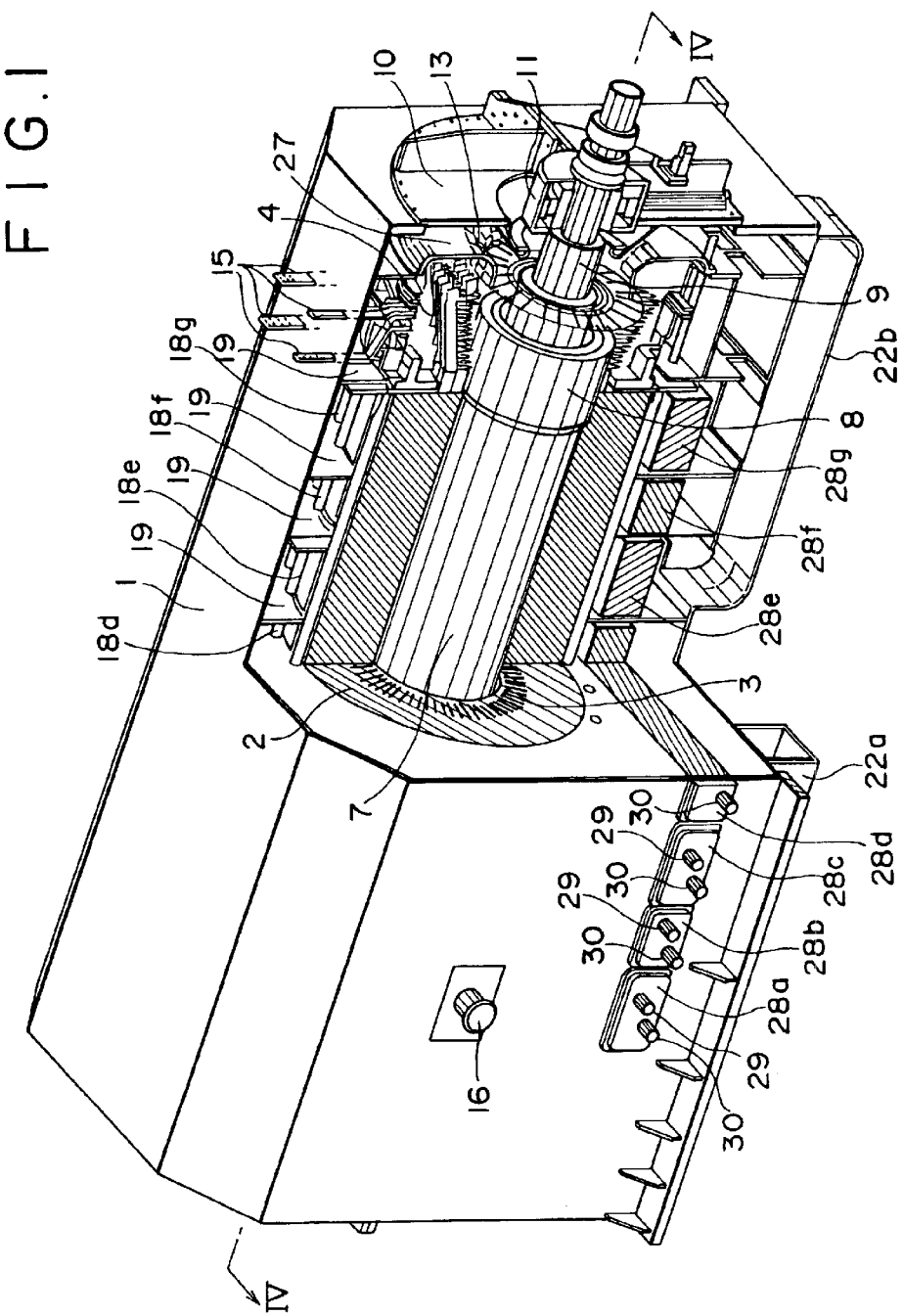
FIG. 1 is a perspective view, with parts partially cutaway, showing the external appearance and inner configuration of a turbine generator according to a first embodiment of the present invention.
Figure 2:
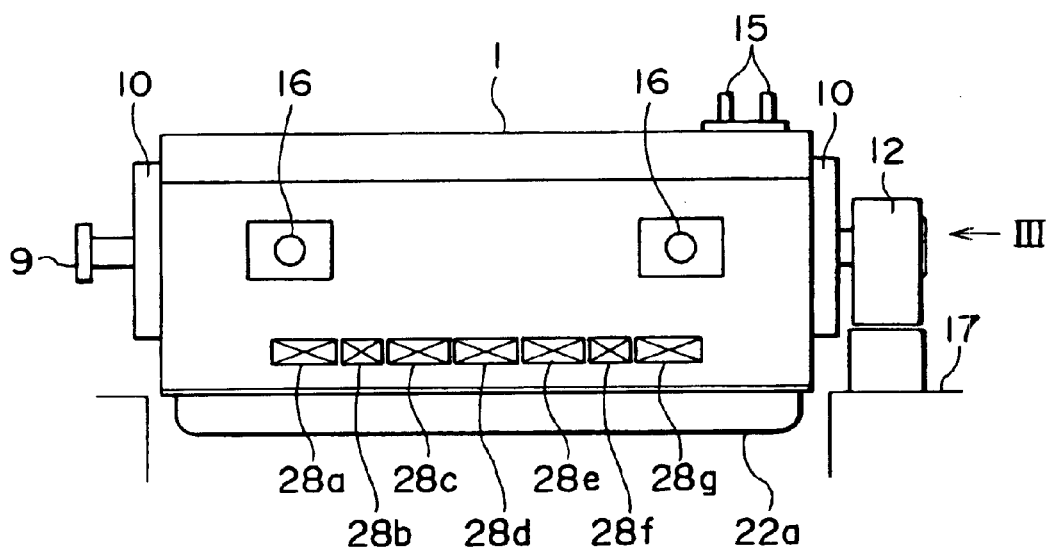
FIG. 2 is a plan view, as seen in the direction shown by an arrow II of FIG. 1, showing the external configuration of the turbine generator.
Figure 3:
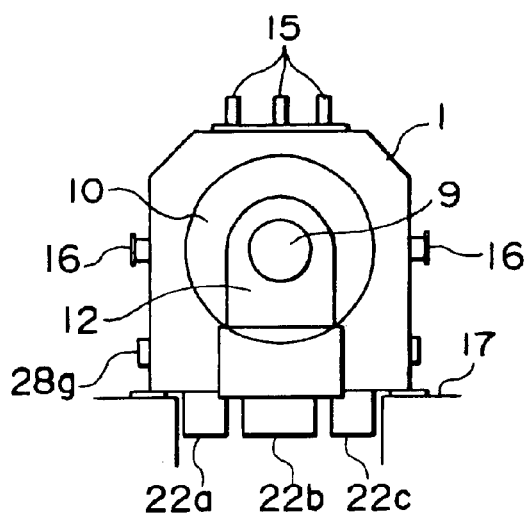
FIG. 3 is a plan view, as seen in the direction shown by an arrow III of FIG. 2, showing the external configuration of the turbine generator.

Hereinafter, various embodiments of the present invention will be described with reference to the drawings.
(First Embodiment)

FIGS. 1 to 4 show the configuration of a turbine generator according to a first embodiment of the present invention. The turbine generator in this embodiment is of an enclosed type (or a full-closed type) in which the inside of the generator is cooled with a coolant enclosed in the generator. In these figures, reference numeral 1 designates a stator frame. A cylindrical stator iron core 2 is provided inside the stator frame 1. A plurality of slots 3, which continuously extend in the axial direction, are formed in an inner peripheral portion of the stator iron core 2 in such a manner as to extend in the peripheral direction. Stator coils 4 are enclosed in the slots 3. A plurality of ventilating ducts 5, which continuously extending the radial direction, are formed in the stator iron core 2 in such a manner as to be spaced from each other at equal intervals in the axial direction.

A rotor iron core 7 is provided on the inner peripheral side of the stator iron core 2 and is disposed with an air gap 6 between the rotor iron core 7 and the stator iron core 2. A plurality of slots (not shown), which continuously extend in the axial direction, are formed in an outer peripheral portion of the rotor iron core 7 in such a manner as to extend in the peripheral direction. Rotor coils (not shown) are enclosed in the slots of the rotor iron core 7. Cylindrical retaining rings 8 for pressing both ends of the rotor coils are provided at both ends of the rotor iron core 7. A rotating shaft 9 is provided integrally with the rotor iron core 7 in such a manner as to extend in the axial direction along the central axis of the rotor iron core 7.

Annular end brackets 10 functioning as block members are provided at both axial ends of the stator frame 1. A bearing apparatus 11 for rotatably supporting the rotating shaft 9 is provided on the inner peripheral side of each end bracket 10. A current collector 12 for supplying power to the rotor coils during rotation is provided at one end (outside the bearing apparatus 11) of the rotating shaft 9. The current collector 12 is configured to electrically connect the stator side to the rotor side by bringing carbon brushes into press-contact with a current-collecting ring provided at the one end (outside the bearing apparatus 11) of the rotating shaft 9. A connecting portion connected to a turbine, serving as a driving source for rotating the generator, is formed at the other end (outside the bearing apparatus 11) of the rotating shaft 9.

Fans 13 for boosting a coolant enclosed in the generator and circulating it in the generator are provided at both ends (inside the bearing apparatuses 11) of the rotating shaft 9. While the fans 13 are used as boosters for boosting the coolant in this embodiment, other types of boosters may be used. The fans 13 provided at both ends (outside the bearing apparatuses 11) of the rotating shaft 9 are right-left symmetrical with respect to a center line 14. The center line 14 is a bisector which crosses the rotating shaft 9 at right angles at such a position as to equally divide the distance between the end brackets 10 into right-left symmetric parts.

Terminals 15 for three-phases of voltage are provided on the upper surface of the stator frame 1 in such a manner as to project upwardly therefrom. The terminals 15 are used for taking generated power out of the stator coils 4, which are electrically connected to the terminals 15. Hoisting accessories 16 are provided on the front surface of the stator frame 1 at two positions and on the back surface thereof at two positions. For example, when installed in a foundation pit 17, the generator main body is hoisted by a crane via wires fastened to the hoisting accessories 16.

Ventilating passages 18a to 18g, which continuously extend in the peripheral direction, are provided between the stator frame 1 and the stator iron core 2 in parallel to each other in the axial direction. The ventilating passages 18a to 18g are formed by a plurality of annular partition plates 19 for partitioning the space between the stator frame 1 and the stator iron core 2 in the axial direction, the inner surface of the stator frame 1, and the outer peripheral surface of the stator iron core 2, and they communicate with the ventilating ducts 5 in the stator iron core 2. The ventilating passages 18a to 18g are right-left symmetrical with respect to the center line 14.

Ventilating ducts 22a to 22c, extending in the axial direction, are provided on the back surface of the stator frame 1 in parallel with each other in a direction perpendicular to the axial direction. The ventilating ducts 22a and 22c form ventilating passages 20 continuously extending in the axial direction. The ventilating passages 20 communicate with the ventilating passages 18b, 18d, and 18f. The ventilating duct 22b forms a ventilating passage 21 continuously extending in the axial direction. The ventilating passage 21 communicates with the ventilating passages 18a, 18c, 18e, and 18g.

Ventilating passages 23 to 26, which continuously extend in the radial direction, are provided between the stator iron core 2 and the end brackets 10. The ventilating passages 23 to 26 are formed by partitioning a space between the stator iron core 2 and the end bracket 10 annular partitioning plates 27 facing the outer peripheral side of the fan 13. The ventilating passages 23 and 24, each of which provides communication between the discharge side of the fan 13 and the ventilating passage 20, are right-left symmetrical with respect to the center line 14. The ventilating passages 25 and 26, each of which provides communication between the suction side of the fan 13 and the ventilating passage 21, are right-left symmetrical with respect to the center line 14.

Each of the ventilating passages 18a to 18g is provided with a cooler for cooling a coolant enclosed in the generator. The coolers 28a to 28g are arranged under the generator in such a manner as to be aligned in a row in the axial direction. It should be noted that the coolers 28a to 28g also may be arranged on the upper portion of the generator. The coolers 28a to 28g are disposed so as to be right-left symmetrical with respect to the center line 14. A pipe line 29 for supplying cooling water and a pipe line 30 for discharging cooling water are connected to each of the coolers 28a to 28g. The coolers 28a to 28g are identical to each other in cooling capacity, but are different from each other in external size depending on the size of the ventilating passage 18 on which the cooler is provided. In this embodiment, since the axial width of each of the ventilating passages 18b and 18f is smaller than that of each of the remaining ventilating passages, the axial width of each of the coolers 28b and 28f is made smaller than that of each of the remaining coolers.

A plurality of ventilating circuits configured by the above-described ventilating passages, etc. are formed in the generator. A first ventilating circuit 29, a second ventilating circuit 30, and a third ventilating circuit 31 are formed on one side (left side in FIG. 4) the center line 14, and similarly three ventilating circuits are formed on the other side (right side in FIG. 4) relative to the center line 14. The three ventilating circuits formed on the one side from the center line 14 are right-left symmetrical relative to the three ventilating circuits formed on the other side from the center line 14. Further, the flow of a coolant and the temperature rise characteristic on the one side from the center line 14 are right-left symmetrical relative to those on the other side from the center line 14. Therefore, the configuration of the ventilating circuits and the flow of a coolant on only one side of the center line 14 will be described below.

Figure 4:
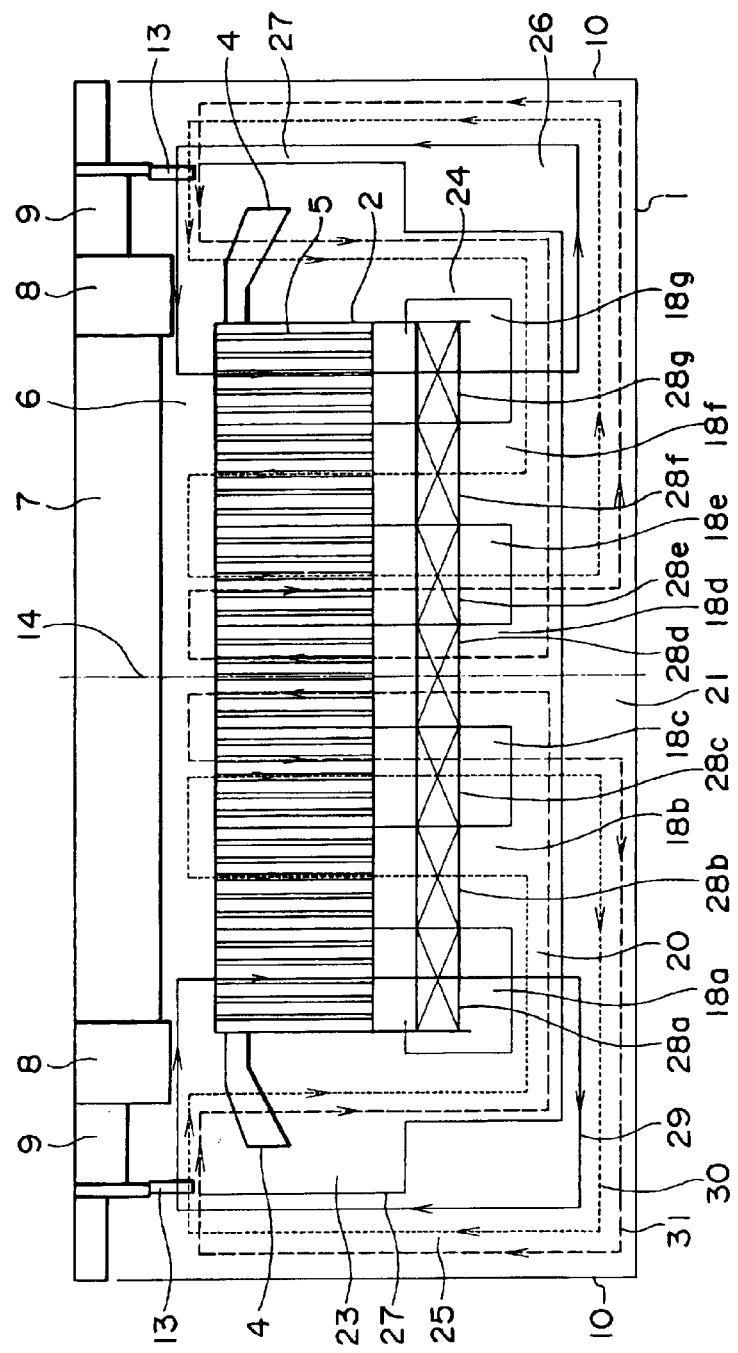
FIG. 4 is a sectional view taken on line IV—IV of FIG. 1, showing the inner structure of a portion, positioned under a rotating shaft, of the turbine generator.

The first ventilating circuit 29 is a closed loop designated by a solid arrow in FIG. 4, which extends from the discharge side of the fan 13 to the ventilating duct 5 via the air gap 6, further extends from the ventilating duct 5 to the cooler 28a via the ventilating passage 18a, and then extends from the cooler 28a to the suction side of the fan 13 via the ventilating passages 21 and 25. In the first ventilating circuit 29, heat sources giving heat to the ventilating passages 18a, air gap 6 and ventilating duct 5 are connected in series to the cooler 28a. The heat source giving heat to the air gap 6 and the ventilating passage 18a is the stator iron core 2 generating iron loss, and the heat sources giving heat to the ventilating duct 5 are the stator iron core 2 generating iron loss and the stator coils 4 generating copper loss.

The second ventilating circuit 30 is a closed loop designated by a dotted arrow in FIG. 4, which extends from the discharge side of the fan 13 to the cooler 28b via the ventilating passage 23, further extends from the cooler 28b to the cooler 28c via the ventilating passage 18b, ventilating duct 5, air gap 6, ventilating duct 5, and then ventilating passage 18c, and extends from the cooler 28c to the suction side of the fan 13 via the ventilating passages 21 and 25. In the second ventilating circuit 30, heat sources and the coolers are alternately arranged in series, and, more specifically, the heat sources giving heat to the ventilating passage 23, the cooler 28b, the heat sources giving heat to the ventilating passages 18b and 18c, air gap 6 and ventilating duct 5, and the cooler 28c are arranged in this order. The heat source giving heat to the air gap 6 and ventilating passages 18b and 18c is the stator iron core 2 generating iron loss, and the heat sources giving heat to the ventilating duct 5 and the ventilating passage 23 are the stator iron core 2 generating iron loss and the stator coils 4 generating copper loss.

The third ventilating circuit 31 is a closed loop designated by a dotted arrow in FIG. 4, which extends from the discharge side of the fan 13 to the cooler 28d via the ventilating passage 23, further extends from the cooler 28d to the cooler 28c via the ventilating passage 18d, ventilating duct 5, air gap 6, ventilating duct 5, and ventilating passage 18c, and then extends from the cooler 28c to the suction side of the fan 13 via the ventilating passages 21 and 25. In the second ventilating circuit 30, heat sources and the coolers are alternately arranged in series, and more specifically, the heat sources giving heat to the ventilating passage 23, the cooler 28d, the heat sources giving heat to the ventilating passages 18d and 18c, air gap 6, and ventilating duct 5, and the cooler 28c are arranged in series in this order. The heat source giving heat to the air gap 6 and the ventilating passages 18d and 18c is the stator iron core 2 generating iron loss, and the heat sources giving heat to the ventilating duct 5 and the ventilating passage 23 are the stator iron core 2 generating iron loss and the stator coils 4 generating copper loss.

The flow of the coolant will be described below. The coolant enclosed in the generator, which is boosted by rotation of the rotating shaft 9, flows from the discharge side of the fan 13 to each ventilating circuit. In the ventilating circuit 29, the coolant boosted by the fan 13 flows axially in the air gap 6 to the ventilating duct 5 communicating with the ventilating passage 18a. The coolant which has reached the ventilating duct 5 communicating with the ventilating duct 18a flows in the ventilating duct 5 from the inner peripheral side to the outer peripheral side of the stator iron core 2, that is, to the ventilating passage 18a while cooling the inside of the stator iron core 2 and the stator coils 4. The coolant which has reached the ventilating passage 18a cools the outer peripheral side of the stator iron core 2 and flows in the ventilating passage 18a to the cooler 28a. The coolant which has reached the cooler 28a is cooled by the cooler 28a and flows from the cooler 28a to the suction side of the fan 13 via the ventilating passages 21 and 25.

In the second ventilating circuit 30, the coolant boosted by the fan 13 flows radially in the ventilating passage 23 to the ventilating passage 20 while cooling the end portion of the stator iron core 2 and the coil end portions of the stator coils 4. The coolant which has reached the ventilating passage 20 flows axially in the ventilating passage 20 to the cooler 28b. The coolant which has reached the cooler 28b is cooled by the cooler 28b and flows in the ventilating passage 18b in the peripheral direction while cooling the outer peripheral portion of the stator iron core 2 and reaches the ventilating duct 5 communicating with the ventilating passage 18b. The coolant which has reached the ventilating duct 5 communicating with the ventilating passage 18b flows in the ventilating duct 5 from the outer peripheral side to the inner peripheral side of the stator iron core 2, that is, to the air gap 6 while cooling the inside of the stator iron core 2 and the stator coils 4.

The coolant which has reached the air gap 6 flows axially in the air gap 6 to the ventilating duct 5 communicating with the ventilating passage 18c while cooling the inner peripheral side of the stator iron core 2. The coolant which has reached the ventilating duct 5 communicating with the ventilating passage 18c flows in the ventilating duct 5 from the inner peripheral side to the outer peripheral side of the stator iron core 2, that is, to the ventilating passage 18c while cooling the inside of the stator iron core 2 and the stator coils 4. The coolant which has reached the ventilating passage 18c cools the outer peripheral side of the stator iron core 2 and flows in the ventilating passage 18c to the cooler 28c. The coolant which has reached the cooler 28c is cooled by the cooler 28c, and flows from the cooler 28c to the suction side of the fan 13 via the ventilating passages 21 and 25.

In the third ventilating circuit 31, the coolant boosted by the fan 13 flows radially in the ventilating passage 23 to the ventilating passage 20 while cooling the end portion of the stator iron core 2 and the coil end portions of the stator coils 4. The coolant which has reached the ventilating passage 20 flows axially in the ventilating passage 20 to the cooler 28d. The coolant which has reached the cooler 28d is cooled by the cooler 28d and flows in the ventilating passage 18d in the peripheral direction while cooling the outer peripheral side of the stator iron core 2 and reaches the ventilating duct 5 communicating with the ventilating passage 18d. The coolant which has reached the ventilating duct 5 communicating with the ventilating passage 18d flows in the ventilating duct 5 from the outer peripheral side to the inner peripheral side of the stator iron core 2, that is, to the air gap 6 while cooling the inside of the stator iron core 2 and the stator coils 4.

The coolant which has reached the air gap 6 flows axially in the air gap to the ventilating duct 5 communicating with the ventilating passage 18c while cooling the inner peripheral side of the stator iron core 2. The coolant which has reached the ventilating duct 5 communicating with the ventilating passage 18c flows in the ventilating duct 5 from the inner peripheral side to the outer peripheral side of the stator iron core 2, that is, to the ventilating passage 18c while cooling the inside of the stator iron core 2 and the stator coils 4. The coolant which has reached the ventilating passage 18c cools the outer peripheral side of the stator iron core 2 and flows in the ventilating passage 18c to the cooler 28c. The coolant which has reached the cooler 28c is cooled by the cooler 28c, and flows from the cooler 28c to the suction side of the fan 13 via the ventilating passages 21 and 25.

According to the embodiment configured as described above, the coolant boosted by the fan 13 is introduced to the ventilating passage 18d positioned at the central portion of the stator iron core 2, being cooled by the cooler 28d, and is allowed to flow from the outer peripheral side to the inner peripheral side of the stator iron core 2, so that the coolant sufficiently cooled by the cooler can be supplied to the central portion of the stator iron core 2.

Accordingly, the central portion of the stator iron core 2 at which the temperature of the supplied coolant tends to become highest and the amount of the supplied coolant tends to become smallest can be cooled by the coolant, which is sufficiently cooled by the cooler, and thereby local heat generation in the air gap 6 can be suppressed. This makes it possible to level the axial temperature rise distribution in the generator and hence to suppress the thermal oscillation stroke of the rotor.

(Second Embodiment)

Figure 5:
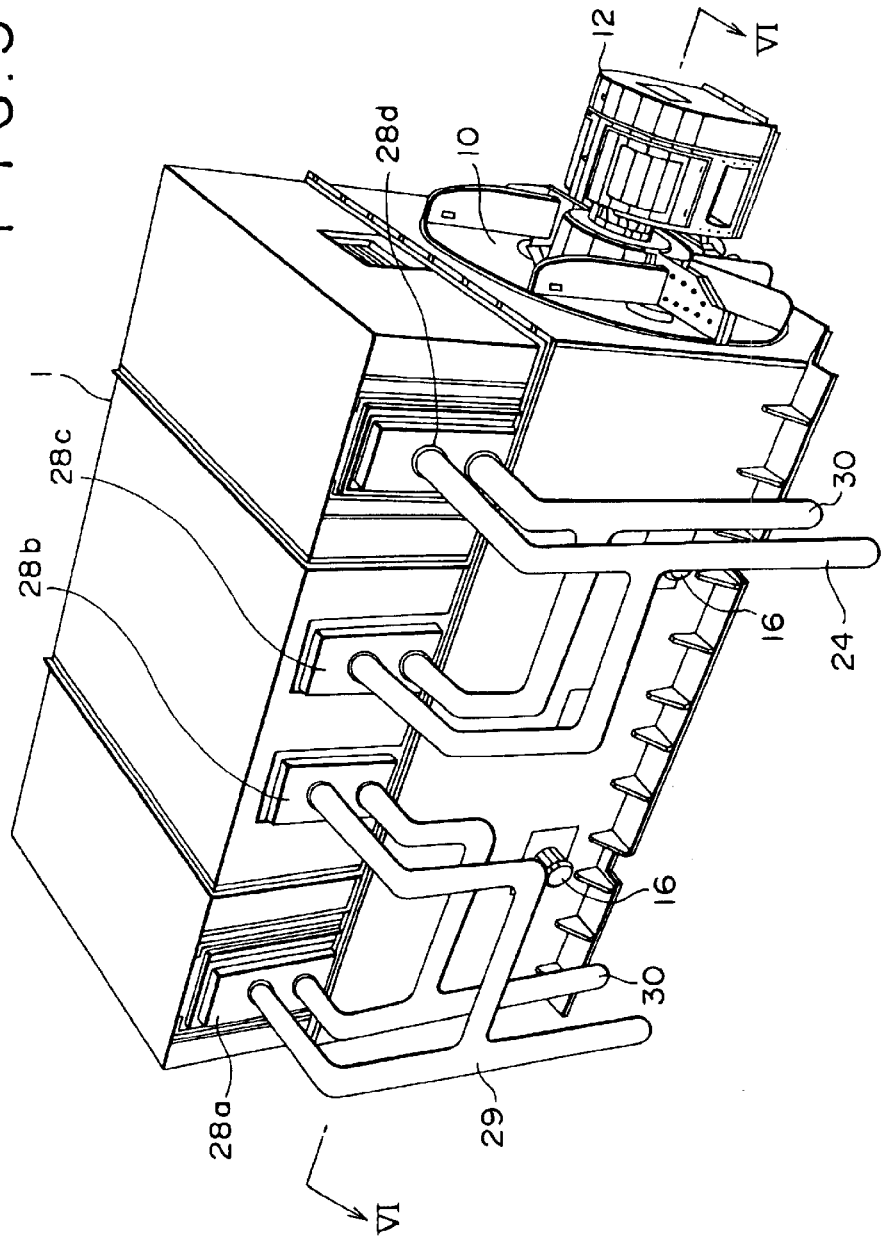
FIG. 5 is a perspective view showing the external configuration of a turbine generator according to a second embodiment of the present invention.
Figure 6:
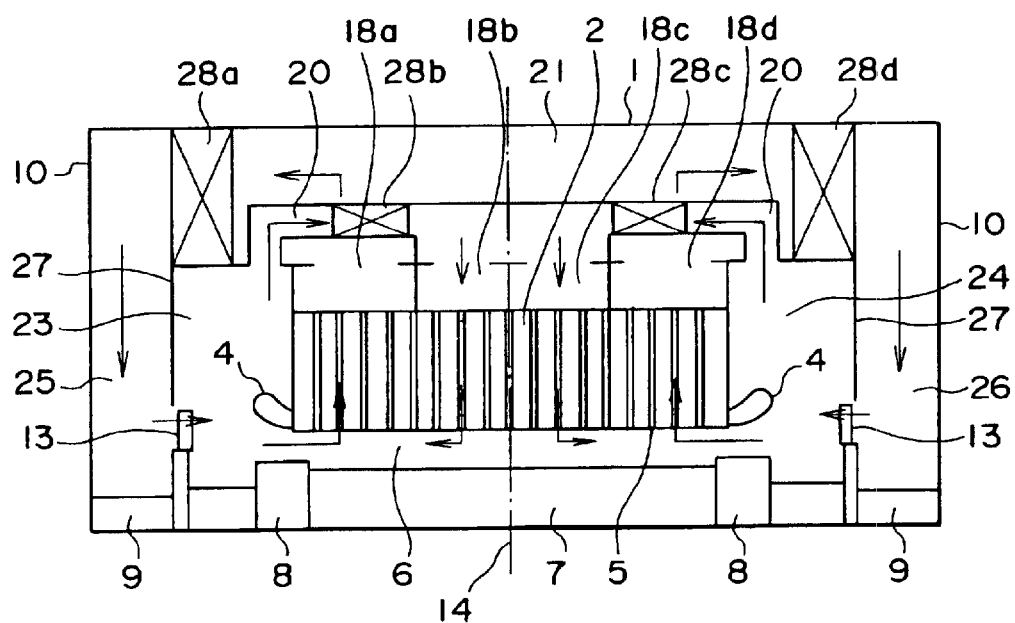
FIG. 6 is a sectional view taken on line VI—VI of FIG. 5, showing the inner structure of a portion, positioned over a rotating shaft, of the turbine generator.

FIGS. 5 and 6 show a configuration of a turbine generator according to a second embodiment. The turbine generator in this embodiment is of an enclosed type (or a full-closed type) like the turbine generator in the first embodiment, but is shorter in axial length (or smaller in generation capacity) than the turbine generator in the first embodiment. Further, the turbine generator in this embodiment is configured such that the coolers 28 and the ventilating passages 20 and 21 provided in the lower portion of the generator in the first embodiment are provided in an upper portion of the generator.

Ventilating passages 18a to 18d, which continuously extend in the peripheral direction, are provided between a stator frame 1 and a stator iron core 2 in parallel with each other in the axial direction. The ventilating passages 18b and 18c are in communication with a ventilating passage 20, and the ventilating passages 18a and 18d are in communication with a ventilating passage 21. Coolers 28a and 28d are provided in the ventilating passage 21 in such a manner as to be right-left symmetrical with respect to a center line 14, and coolers 28b and 28c are provided in the ventilating passage 20 in such a manner as to be right-left symmetrical with respect to the center line 14. The coolers 28a to 28d are aligned in a row in the axial direction.

The coolers 28b and 28c are smaller in size, that is, have a smaller cooling capacity than the coolers 28a and 28d. One reason for this is that the coolers 28b and 28c are used for cooling part of a coolant which has been cooled by the coolers 28a and 28d, and therefore, it is sufficient for the coolers 28b and 28c to be smaller in cooling capacity than the coolers 28a and 28d. This is advantageous in terms of cooling efficiency. Another reason is that, since the ventilating passage 20 in which the coolers 28b and 28c are provided is smaller than the ventilating passage 21 in which the coolers 28a and 28d are provided, the sizes of the coolers 28b and 28c must be made smaller those of the coolers 28a and 28d. It should be noted that the coolers 28a to 28d may be arranged in the lower portion of the generator.

The other features of this embodiment are the same as those of the first embodiment, and therefore, a description thereof is omitted. In addition, since the ventilating passages and coolers are respectively right-left symmetrical with respect to the center line 14, and also the flow of a coolant and the temperature rise characteristic are respectively right-left symmetrical with respect to the center line 14, the configuration on only one side of the center line 14 will be described below.

The flow of a coolant will be described. When a fan 13 is rotated along with rotation of a rotating shaft 9, a coolant enclosed in the generator is boosted and is allowed to flow in respective ventilating passages. The coolant discharged on the discharge side of the fan 13 is branched into one component on a ventilating passage 23 side and another component on an air gap 6 side. The coolant component branched on the air gap 6 side flows in an air gap 6 to a ventilating duct 5 communicating with the ventilating passage 18a while cooling the inner peripheral side of the stator iron core 2.

The coolant component which has reached the ventilating duct 5 communicating with the ventilating passage 18a flows in the ventilating duct 5 from the inner peripheral side to the outer peripheral side of the stator iron core 2, that is, to the ventilating passage 18a while cooling the inside of the stator iron core 2 and stator coils 4. The coolant component which has reached the ventilating passage 18a cools the outer peripheral side of the stator iron core 2 and flows from the ventilating passage 18a to the cooler 28a via the ventilating passage 21. The coolant component which has reached the cooler 28a is cooled by the cooler 28a and flows from the cooler 28a to the suction side of the fan 13 via the ventilating passage 25.

The coolant component branched on the ventilating passage 23 side flows radially in a ventilating passage 23 to the ventilating passage 20 while cooling the end portion of the stator iron core 2 and the coil end portions of the stator coils 4. The coolant component which has reached the ventilating passage 20 flows axially in the ventilating passage 20 to the cooler 28b. The coolant component which has reached the cooler 28b is cooled by the cooler 28b, and flows from the cooler 28b to the ventilating passage 18b. The coolant component which has reached the ventilating passage 18b cools the outer peripheral side of the stator iron core 2, and flows in the ventilating passage 18b to the ventilating duct 5 communicating with the ventilating passage 18b.

The coolant component which has reached the ventilating duct 5 communicating with the ventilating passage 18b flows in the ventilating duct 5 from the outer peripheral side to the inner peripheral side of the stator iron core 2, that is, to the air gap 6 while cooling the inside of the stator iron core 2 and the stator coils 4. The coolant component which has reached the air gap 6 flows axially in the air gap 6 to the ventilating duct 5 communicating with the ventilating passage 18a while cooling the inner peripheral side of the stator iron core 2. The coolant component which has reached the ventilating duct 5 communicating with the ventilating passage 18a flows in the ventilating ducts 5 together with the above-described coolant component which has been branched from the discharge side of the fan 13 onto the air gap 6 side.

According to this embodiment, part of the coolant cooled by the cooler 28a (or 28d) and boosted by the fan 13 is branched; and, the coolant component thus branched is cooled by the cooler 28b (or 28c), being introduced to the ventilating passage 18b (or 18c) positioned at the central portion of the stator iron core 2, and is allowed to flow from the outer peripheral side to the inner peripheral side of the stator iron core 2. Accordingly, it is possible to supply the coolant sufficiently cooled by the cooler, to the central portion in the axial direction of the stator iron core 2.

As a result, according to this embodiment, the central portion of the stator iron core 2 at which the temperature of the supplied coolant tends to become highest and the amount of the supplied coolant tends to become smallest can be cooled by the coolant, which is sufficiently cooled by the cooler, so that it is possible to suppress local heat generation in the air gap 6, and hence to level the axial temperature rise distribution in the generator.

(Third Embodiment)

Figure 7:
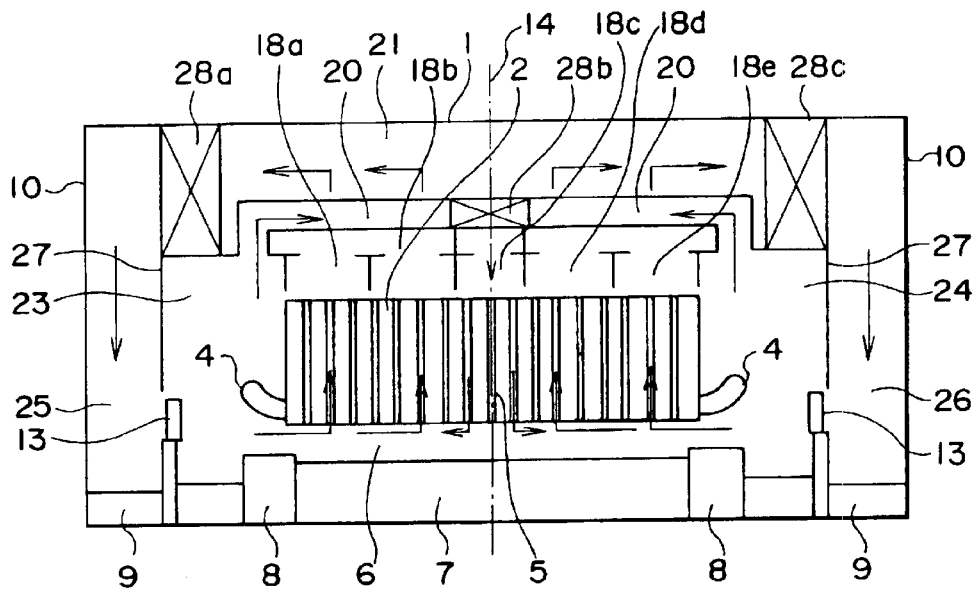
FIG. 7 is a sectional view showing the inner structure of a portion, positioned over a rotating shaft, of a turbine generator according to a third embodiment.

FIG. 7 shows a configuration of a turbine generator according to a third embodiment. This embodiment is a variation of the second embodiment, characterized in that the axial length of the turbine generator in this embodiment is longer than that of the turbine generator in the second embodiment. Ventilating passages 18a to 18e, which continuously extend in the peripheral direction, are provided between a stator frame 1 and a stator iron core 2 in parallel to each other in the axial direction. The ventilating passages 18a, 18b, 18d and 18e are in communication with a ventilating passage 21, and the ventilating passage 18c is in communication with a ventilating passage 20. Coolers 28a and 28c are provided in the ventilating passage 21 in such a manner as to be right-left symmetrical with respect to a center line 14, and a cooler 28b is provided in the ventilating passage 20 at a communicating portion communicating with the ventilating passage 18c. The cooler 28b is smaller in size or cooling capacity than each of the coolers 28a and 28c.

The other features of this embodiment are the same as those of the second embodiment, and, therefore, a description thereof is omitted. In addition, since the ventilating passages and coolers are respectively right-left symmetrical with respect to the center line 14, and also the flow of coolant and the temperature rise characteristic are respectively right-left symmetrical with respect to the center line 14, the configuration on only one side of the center line 14 will be described below.

The flow of a coolant will be described. When a fan 13 is rotated along with rotation of a rotating shaft 9, a coolant enclosed in the generator is boosted and is allowed to flow in respective ventilating passages. The coolant discharged on the discharge side of the fan 13 is branched into one component on a ventilating passage 23 side and another component on an air gap 6 side. The coolant component branched on the air gap 6 side flows in an air gap 6 to ventilating ducts 5 communicating with the ventilating passages 18a and 18b while cooling the inner peripheral side of the stator iron core 2.

The coolant component which has reached the ventilating ducts 5 communicating with the ventilating passages 18a and 18b flows in the ventilating ducts 5 from the inner peripheral side to the outer peripheral side of the stator iron core 2, that is, to the ventilating passages 18a and 18b, while cooling the inside of the stator iron core 2 and stator coils 4. The coolant component which has reached the ventilating passages 18a and 18b cools the outer peripheral side of the stator iron core 2 and flows from the ventilating passages 18a and 18b to the cooler 28a via the ventilating passage 21. The coolant component which has reached the cooler 28a is cooled by the cooler 28a and flows from the cooler 28a to the suction side of the fan 13 via a ventilating passage 25.

The coolant component branched on the ventilating passage 23 side flows radially in a ventilating passage 23 to the ventilating passage 20, while cooling the end portion of the stator iron core 2 and the coil end portions of the stator coils 4. The coolant component which has reached the ventilating passage 20 flows axially in the ventilating passage 20 to the cooler 28b. The coolant component which has reached the cooler 28b is cooled by the cooler 28b, and flows from the cooler 28b to the ventilating passage 18c. The coolant component which has reached the ventilating passage 18c cools the outer peripheral side of the stator iron core 2 and flows in the ventilating passage 18c to the ventilating duct 5 communicating with the ventilating passage 18c.

The coolant component which has reached the ventilating duct 5 communicating with ventilating passage 18c flows in the ventilating duct 5 from the outer peripheral side to the inner peripheral side of the stator iron core 2, that is, to the air gap 6, while cooling the inside of the stator iron core 2 and the stator coils 4. The coolant component which has reached the air gap 6 flows axially in the air gap 6 to the ventilating ducts 5 communicating with the ventilating passages 18a and 18b, while cooling the inner peripheral side of the stator iron core 2. The coolant component which has reached the ventilating ducts 5 communicating with the ventilating passages 18a and 18b flows in the ventilating ducts 5 together with the above-described coolant component which has been branched from the discharge side of the fan 13 onto the air gap 6 side.

According to this embodiment, part of the coolant cooled by the cooler 28a (or 28c) and boosted by the fan 13 is branched; and, the coolant component thus branched is cooled by the cooler 28c, being introduced to the ventilating passage 18c positioned at the central portion of the stator iron core 2, and is allowed to flow from the outer peripheral side to the inner peripheral side of the stator iron core 2. Accordingly, it is possible to supply the coolant, which is sufficiently cooled by the cooler, to the central portion of the stator iron core 2.

As a result, according to this embodiment, the central portion of the stator iron core 2, at which the temperature of the supplied coolant tends to become highest and the amount of the supplied coolant tends to become smallest, can be cooled by the coolant, which is sufficiently cooled by the cooler, so that it is possible to suppress local heat generation in the air gap 6, and hence to level the axial temperature rise distribution in the generator.

(Fourth Embodiment)

Figure 8:
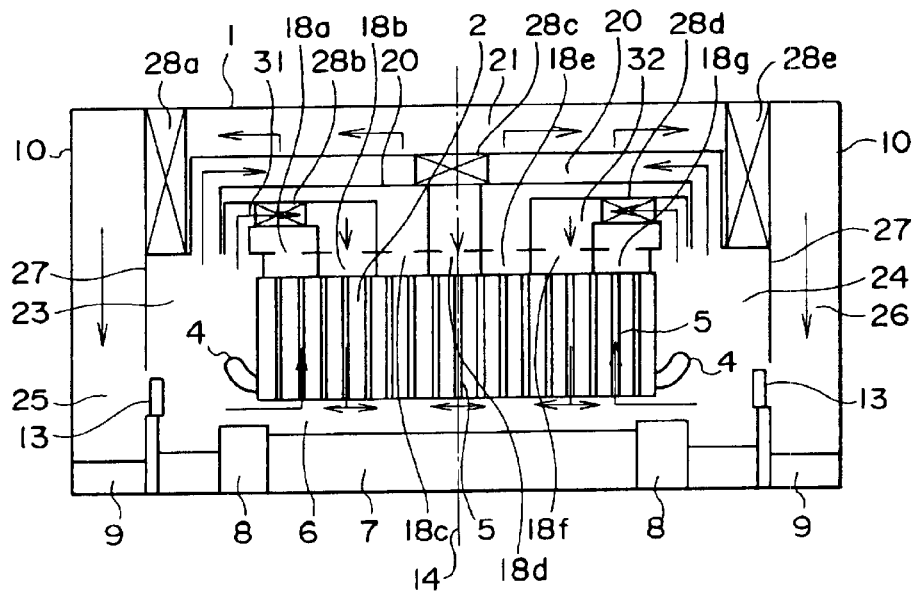
FIG. 8 is a sectional view showing the inner structure of a portion, positioned over a rotating shaft, of a turbine generator according to a fourth embodiment of the present invention.

FIG. 8 shows a configuration of a turbine generator according to a fourth embodiment. This embodiment is a combination of the second and third embodiments, characterized in that the axial length of the turbine generator in this embodiment is longer than that of the turbine generator in the third embodiment. Ventilating passages 18a to 18g, which continuously extend in the peripheral direction, are provided between a stator frame 1 and a stator iron core 2 in parallel to each other in the axial direction. The ventilating passages 18a, 18c, 18e and 18g are in communication with a ventilating passage 21, and the ventilating passage 18d is in communication with a ventilating passage 20. A ventilating passage 31 for connecting a ventilating passage 23 to the ventilating passage 18b and a ventilating passage 32 for connecting a ventilating passage 24 to the ventilating passage 18f are provided between the stator frame 1 and the stator iron core 2 in such a manner as to be right-left symmetrical with respect to a center line 14.

Coolers 28a and 28e are provided in the ventilating passage 21 in such a manner as to be right-left symmetrical with respect to the center line 14. A cooler 28c is with provided in the ventilating passage 20 at a portion communicating with the ventilating passage 18d. The cooler 28c is smaller in size or cooling capacity than each of the coolers 28a and 28e. Coolers 28b and 28d are provided in the ventilating passage 31 in such a manner as to be right-left symmetrical with respect to the center line 14. The coolers 28b and 28d are each smaller in size or cooling capacity than each of the coolers 28a and 28e.

The other features of this embodiment are the same as those of each of the second and third embodiments, and, therefore, a description thereof is omitted. In addition, since the ventilating passages and coolers are respectively right-left symmetrical with respect to the center line 14, and also the flow of a coolant and the temperature rise characteristic are respectively right-left symmetrical with respect to the center line 14, the configuration on only one side of the center line 14 will be described below.

The flow of a coolant will be described. When a fan 13 is rotated along with rotation of a rotating shaft 9, a coolant enclosed in the generator is boosted and is allowed to flow in respective ventilating passages. The coolant discharged on the discharge side of the fan 13 is branched into one component on a ventilating passage 23 side and another component on an air gap 6 side. The coolant component branched on the air gap 6 side flows in an air gap 6 to ventilating ducts 5 communicating with the ventilating passages 18a and 18c while cooling the inner peripheral side of the stator iron core 2.

The coolant component which has reached the ventilating ducts 5 communicating with the ventilating passages 18a and 18c flows in the ventilating ducts 5 from the inner peripheral side to the outer peripheral side of the stator iron core 2, that is, to the ventilating passages 18a and 18c, while cooling the inside of the stator iron core 2 and stator coils 4. The coolant component which has reached the ventilating passages 18a and 18c cools the outer peripheral side of the stator iron core 2 and flows from the ventilating passages 18a and 18c to the cooler 28a via the ventilating passage 21. The coolant component which has reached the cooler 28a is cooled by the cooler 28a and flows from the cooler 28a to the suction side of the fan 13 via a ventilating passage 25.

The coolant component branched onto the ventilating passage 23 side flows radially in the ventilating passage 23 to the ventilating passages 20 and 31, while cooling the end portion of the stator iron core 2 and the coil end portions of the stator coils 4. The coolant component which has reached the ventilating passage 20 flows axially in the ventilating passage 20 to the cooler 28c. The coolant component which has reached the cooler 28c is cooled by the cooler 28c and flows from the cooler 28c to the ventilating passage 18d. The coolant component which has reached the ventilating passage 18d cools the outer peripheral side of the stator iron core 2 and flows in the ventilating passage 18d to the ventilating duct 5 communicating with the ventilating passage 18d.

The coolant component which has reached the ventilating duct 5 communicating with the ventilating passage 18d flows in the ventilating duct 5 from the outer peripheral side to the inner peripheral side of the stator iron core 2, that is, to the air gap 6, while cooling the inside of the stator iron core 2 and the stator coils 4. The coolant component which has reached the air gap 6 flows axially in the air gap 6 to the ventilating ducts 5 communicating with the ventilating passages 18a and 18c while cooling the inner peripheral side of the stator iron core 2. The coolant component which has reached the ventilating ducts 5 communicating with the ventilating passages 18a and 18c flows in the ventilating ducts 5 together with the above-described coolant component which has been branched from the discharge side of the fan 13 onto the air gap 6 side.

The coolant component which has reached the ventilating passage 31 flows axially in the ventilating passage 31 to the cooler 28b. The coolant component which has reached the cooler 28b is cooled by the cooler 28b and flows from the cooler 28b to the ventilating passage 18b. The coolant component which has reached the ventilating passage 18b cools the outer peripheral side of the stator iron core 2 and flows in the ventilating passage 18b to the ventilating duct 5 communicating with the ventilating passage 18b.

The coolant component which has reached the ventilating duct 5 communicating with the ventilating passage 18b flows in the ventilating duct 5 from the outer peripheral side to the inner peripheral side of the stator iron core 2, that is, to the air gap 6, while cooling the inside of the stator iron core 2 and the stator coils 4. The coolant component which has reached the air gap 6 flows axially in the air gap 6 to the ventilating ducts 5 communicating with the ventilating passages 18a and 18c, while cooling the inner peripheral side of the stator iron core 2. The coolant component which has reached the ventilating ducts 5 communicating with the ventilating passages 18a and 18c flows in the ventilating ducts 5 together with the above-described coolant component which has been branched from the discharge side of the fan 13 onto the air gap 6 side.

According to this embodiment, part of the coolant cooled by the cooler 28a (or 28e) and boosted by the fan 13 is branched; and, the coolant component thus branched is cooled by the cooler 28c, being introduced to the ventilating passage 18d positioned at the central portion of the stator iron core 2, and is allowed to flow from the outer peripheral side to the inner peripheral side of the stator iron core 2. Accordingly, it is possible to supply the coolant, which is sufficiently cooled by the cooler, to the central portion of the stator iron core 2.

As a result, according to this embodiment, the central portion of the stator iron core 2, at which the temperature of the supplied coolant tends to become highest and the amount of the supplied coolant tends to become smallest, can be cooled by the coolant, which is sufficiently cooled by the cooler, so that it is possible to suppress local heat generation in the air gap 6, and hence to level the axial temperature rise distribution in the generator.

(Fifth Embodiment)

Figure 9:
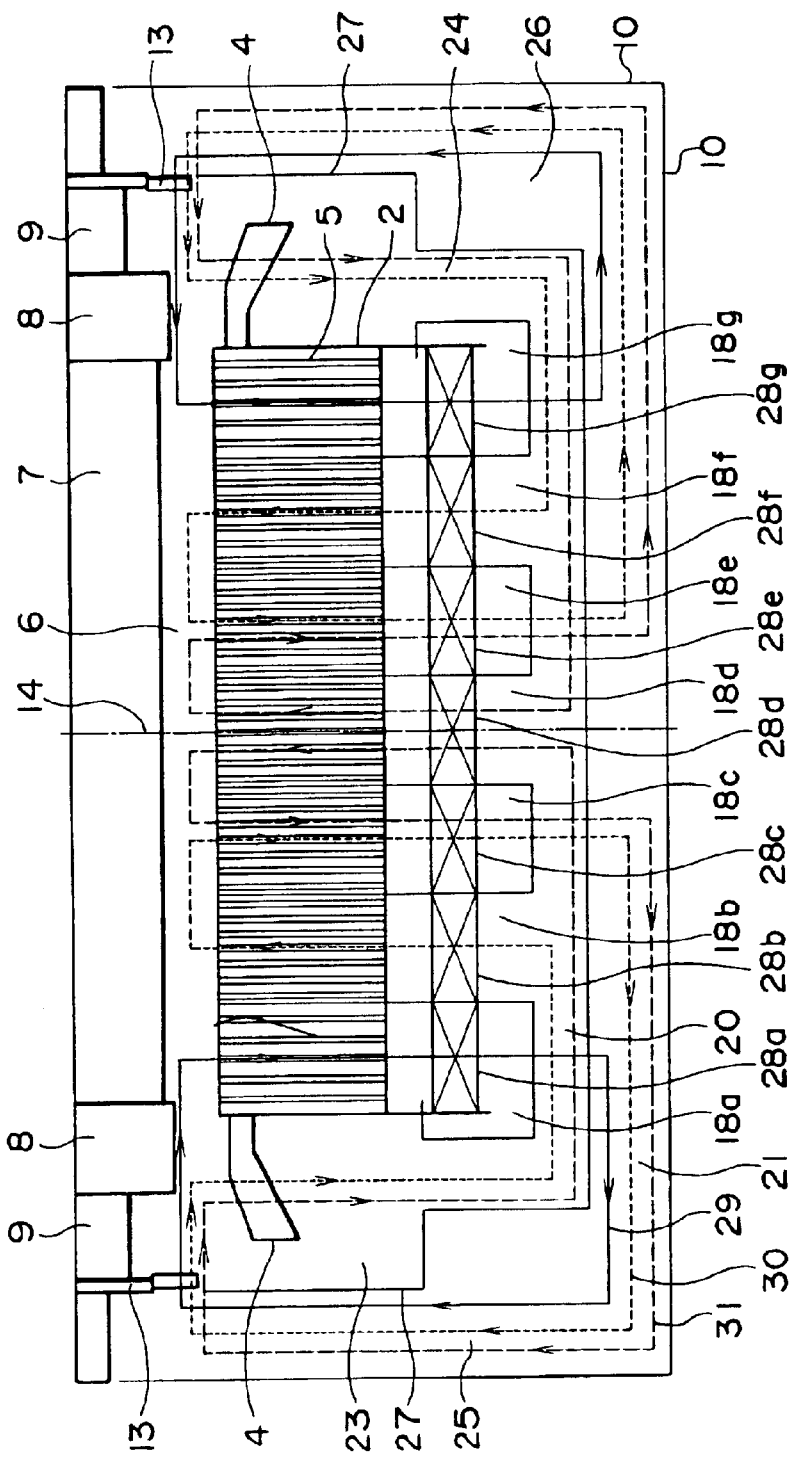
FIG. 9 is a sectional view showing the inner structure of a portion, positioned under a rotating shaft, of a turbine generator according to a fifth embodiment of the present invention.

FIG. 9 shows a configuration of a turbine generator according to a fifth embodiment. This embodiment is an improvement over the first embodiment, which is effective in the case where the axial length of a stator iron core 2 becomes longer. In this embodiment, the axial interval between two adjacent ventilating ducts 5 provided in the stator iron core 2 is set at a large value in a first ventilating circuit 29 and is set at a small, value in each of second and third ventilating circuits 30 and 31, which are larger in ventilating distance and thermal load than the first ventilating circuit 29. The remainder of the configuration is the same as that of the first embodiment, and therefore, a description thereof is omitted.

According to this embodiment, since the axial interval between two adjacent ventilating ducts 5 differs among the ventilating circuits 29, 30 and 31, it is possible to reduce the amount of coolant flowing in the first ventilating circuit 29, which is close to the fan 13, and thereby shorten the ventilating distance and increase the amount of coolant flowing in each of the second and third ventilating circuits 30 and 31, which are more distant from a fan 13 and thereby longer in ventilating distance, and hence to improve the effect of cooling the central portion of the stator iron core 2 and its neighborhood.

Further, in this embodiment, since the axial interval between two adjacent ventilating ducts 5 differs among the ventilating circuits, it is possible to increase the cooling area of the central portion of the stator iron core 2 and its neighborhood by reducing the exposed area of the stator iron core 2 and stator coils 4 in the first ventilating circuit 29, which has a small thermal load, and by increasing the exposed area of the stator iron core 2 and the stator coils 4 in each of the second and third ventilating circuits 20 and 31, which have a large ventilating distance and thermal load, and hence to further improve the effect of cooling the central portion of the stator iron core 2 and its neighborhood.

It should be noted that this embodiment has been described as an improvement over the first embodiment however, the configuration of this embodiment may be applied to the other embodiments as well.

(Sixth Embodiment)

Figure 10:
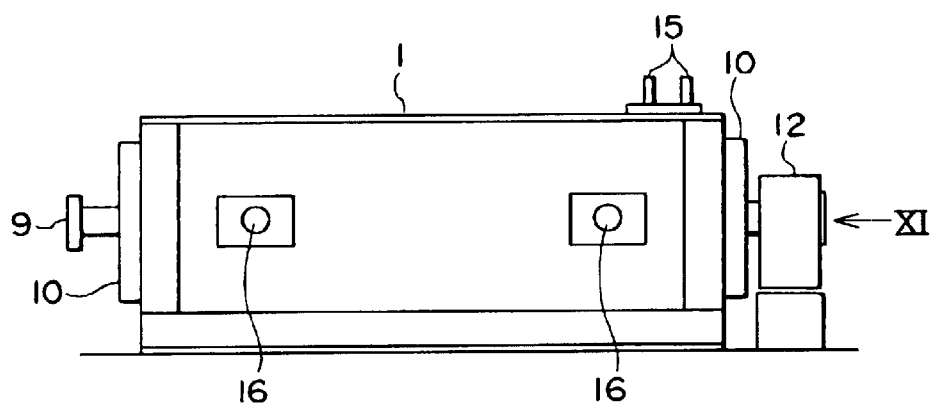
FIG. 10 is a front view showing the external configuration of a turbine generator according to a sixth embodiment of the present invention.
Figure 11:
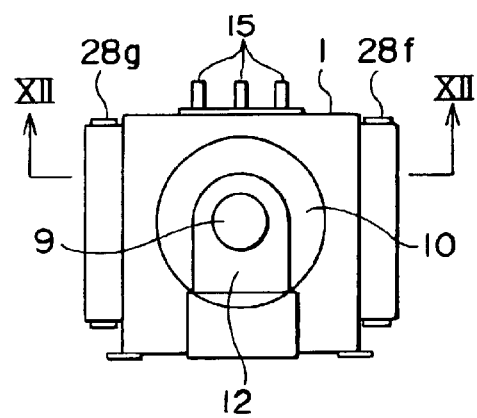
FIG. 11 is a side view, as seen in the direction shown by an arrow XI of FIG. 10, showing the external configuration of the turbine generator.
Figure 12:
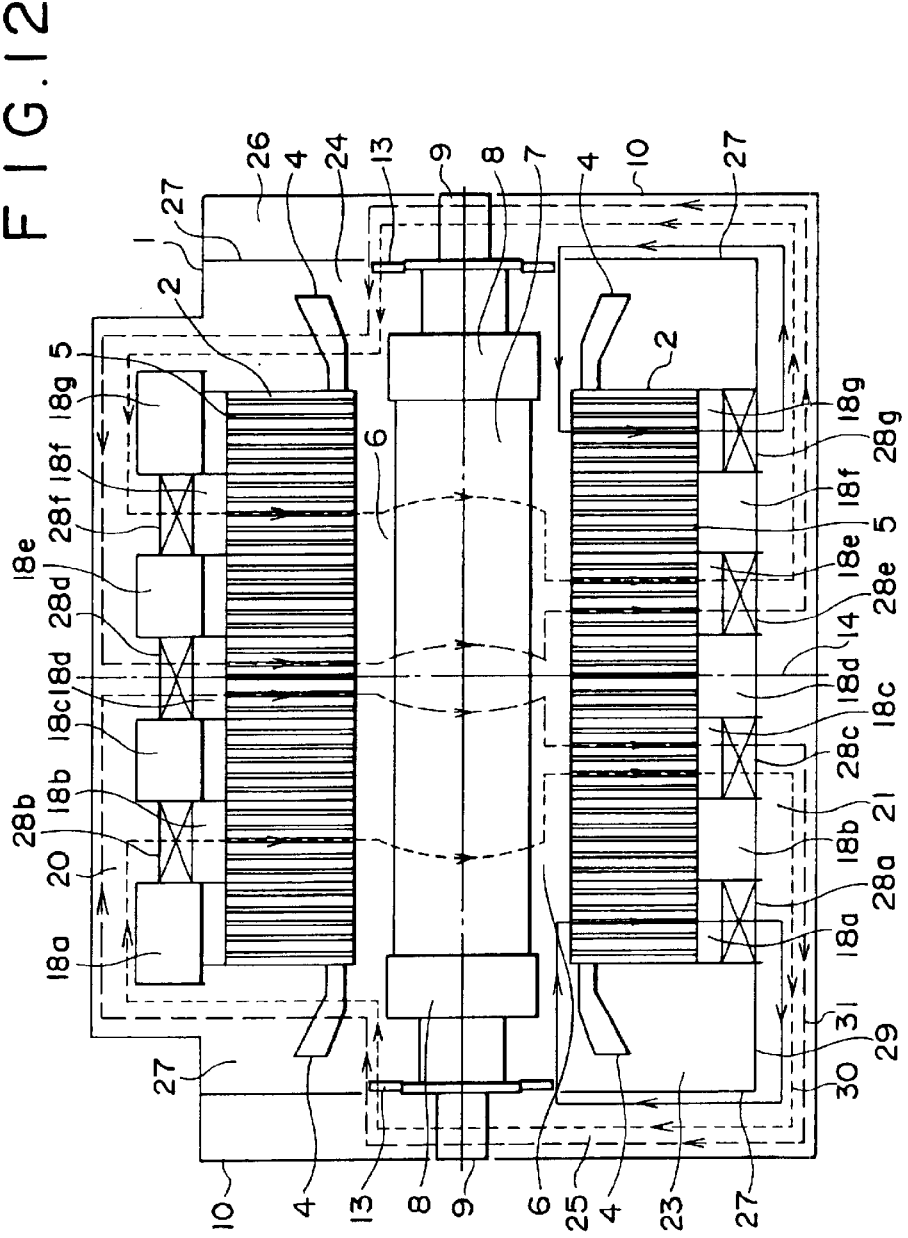
FIG. 12 is a sectional top view taken on line XII—XII of FIG. 11, showing the inner configuration of the turbine generator.

FIGS. 10 to 12 show a configuration of a turbine generator according to a sixth embodiment. This embodiment is a variation of the first embodiment, in which the coolers 28 and the ventilating passages 20 and 21 provided in the lower portion of the generator in the first embodiment are provided in both a front portion (front surface side) and a rear portion (back surface side) of the generator. The coolers placed in the vertical direction are aligned in a row in the axial direction on the front and back surfaces of the generator in such a manner as to project therefrom.

A cooler 28a provided in a ventilating passage 18a, a cooler 28c provided in a ventilating passage 18c, a cooler 28e provided in a ventilating passage 18e, and a cooler 28g provided in a ventilating passage 18g are arranged on the front portion of the generator in such a manner as to be right-left symmetrical with respect to a center line 14. A ventilating passage 21 communicating with the ventilating passages 18a, 18c, 18e, and 18g is provided in the front portion of the generator.

A cooler 28b provided in a ventilating passage 18b, a cooler 28d provided in a ventilating passage 18d, and a cooler 28f provided in a ventilating passage 18f are arranged on the rear portion of the generator in such a manner as to be right-left symmetrical with respect to the center line 14. A ventilating passage 20 communicating with the ventilating passages 18b, 18d, and 18e is provided in the front portion of the generator. The remainder of the configuration is the same as that of the first embodiment, and therefore, a description thereof is omitted.

According to this embodiment, the coolers 28a, 28c, 28e, and 28g are arranged on one side (front portion of the generator) of a space between a stator frame 1 and a stator iron core 2, which are opposed to each other with respect to a rotating shaft 9, and the coolers 28b, 28d, and 28f are arranged on the other side (rear portion of the generator) of the space. Accordingly, in the first, second, and third ventilating circuits 29, 30 and 31, a region in which a coolant flows from the inner peripheral side to the outer peripheral side of the stator iron core 2 and then passes through the coolers 28 can be formed in the front portion of the generator, and a region in which the coolant passes through the coolers 28 and then flows from the outer peripheral side to the inner peripheral side of the stator iron core 2 can be formed in the rear portion of the generator. As a result, it is possible to eliminate the intersection of the ventilating passages in which the coolant flows, and hence to reduce the ventilating resistance of the coolant. This makes it possible to increase the amount of the coolant to be supplied to the central portion of the stator iron core 2 and its neighborhood, and hence to further improve the effect of cooling the central portion of the stator iron core 2.

In this embodiment, description has been made by way of the example in which the coolers are arranged in both the front and rear portions of the generator; however, the same effect can be obtained even by adopting an example in which the coolers are arranged in both the upper and lower portions of the generator.

(Seventh Embodiment)

Figure 13:
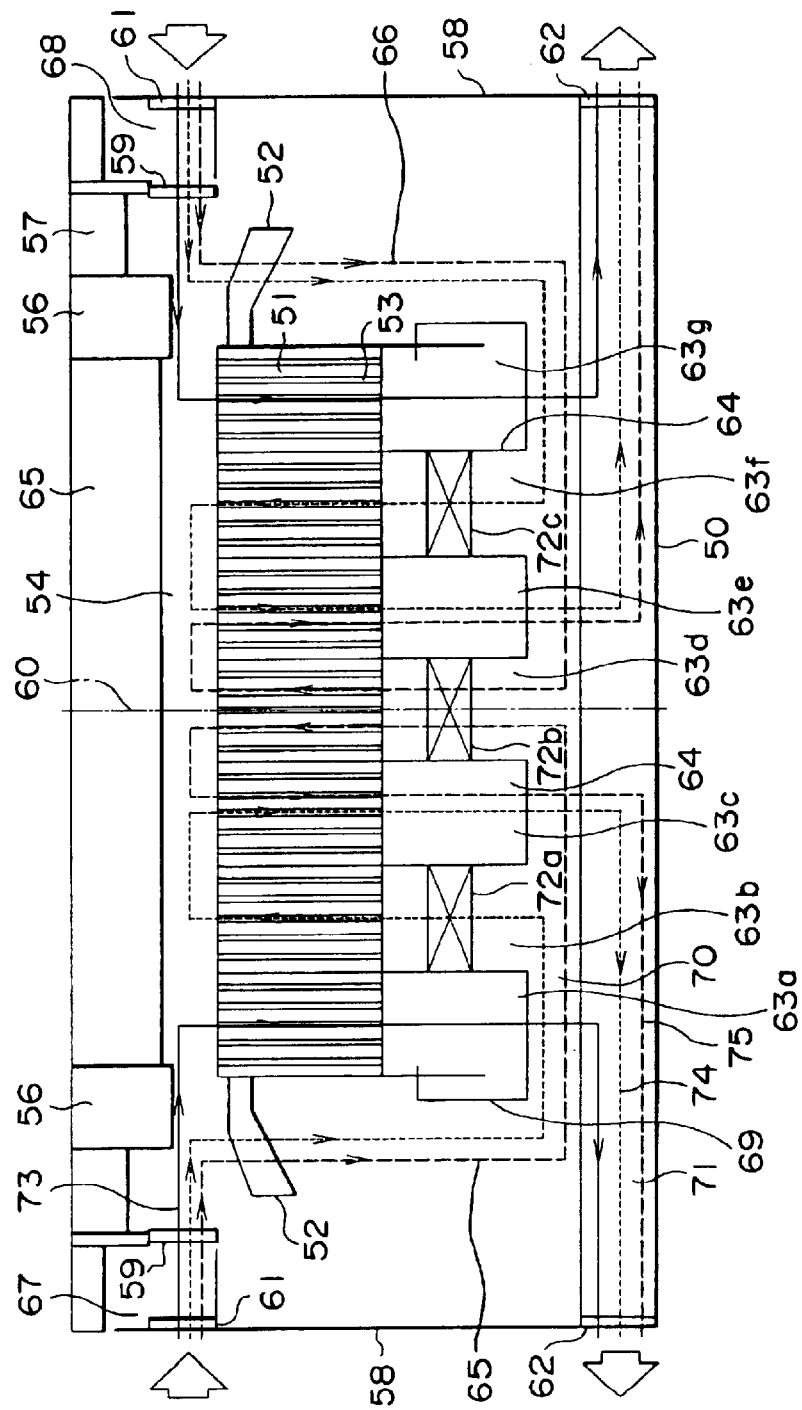
FIG. 13 is a sectional view showing the inner configuration of a portion, positioned under a rotating shaft, of a turbine generator according to a seventh embodiment of the present invention.

FIG. 13 shows a configuration of a turbine generator according to a seventh embodiment. The turbine generator in this embodiment is of an open-type in which the inside of the generator is cooled by atmospheric air sucked in the generator. In the figure, reference numeral 50 designates a stator frame. A cylindrical stator iron core 51 is provided inside the stator frame 50. A plurality of slots, which continuously extend in the axial direction, are formed in an inner peripheral portion of the stator iron core 51 in such a manner as to extend in the peripheral direction. Stator coils 52 are enclosed in the slots. A plurality of ventilating ducts 53, which continuously extend in the radial direction, are formed in the stator iron core 51 in such a manner as to be spaced from each other at equal intervals in the axial direction.

A rotor iron core 55 is provided on the inner peripheral side of the stator iron core 51 with an air gap 54 disposed between the rotor iron core 55 and the stator iron core 51. A plurality of slots, which continuously extend in the axial direction, are formed in an outer peripheral portion of the rotor iron core 55 in such a manner as to extend in the peripheral direction, and rotor coils are enclosed in the slots. Cylindrical retaining rings 56 for pressing both ends of the rotor coils are provided at both ends of the rotor iron core 55.

A rotating shaft 57 is provided integrally with the rotor iron core 55 in such a manner as to extend in the axial direction along the central axis of the rotor iron core 55.

Annular end brackets 58 functioning as block members are provided at both axial ends of the stator frame 50. A bearing apparatus for rotatably supporting the rotating shaft 57 is provided on the inner peripheral side of each end bracket 58. A current collector for supplying power to the rotor coils during rotation is provided at one end (outside the bearing apparatus) of the rotating shaft 57. A connecting portion connected to a turbine serving as a driving source of the generator is formed at the other end (outside the bearing apparatus) of the rotating shaft 57.

Fans 59 for boosting a coolant sucked in the generator and circulating it in the generator are provided at both ends (inside the bearing apparatuses) of the rotating shaft 57. While the fans 59 are used as the boosters for boosting the coolant in this embodiment, other types of boosters may be used. The fans 59 provided at both ends (outside the bearing apparatuses) of the rotating shaft 57 are right-left symmetrical with respect to a center line 60. The center line 60 is a bisector which crosses the rotating shaft 57 at right angles at such a position as to equally divide the distance between the end brackets 58 into two right-left symmetric parts.

An air suction hole 61 for sucking atmospheric air in the generator is provided on the inner peripheral side of each end bracket 58 in such a manner as to face the fan 59. An air discharge hole 62 for discharging the atmospheric air which has been sucked in the generator to the outside of the generator is provided on the outer peripheral side of each end bracket 58.

Ventilating passages 63a to 63g, which continuously extend in the peripheral direction, are provided between the stator frame 50 and the stator iron core 51 in parallel with each other in the axial direction. The ventilating passages 63a to 63g are formed by a plurality of annular partition plates 64 for partitioning a space between the stator frame 50 and the stator iron core 51 in the axial direction, the inner surface of the stator frame 50, and the outer peripheral surface of the stator iron core 51, and are in communication with the ventilating ducts 53. The ventilating passages 63a to 63g are right-left symmetrical with respect to the center line 60.

Ventilating passages 65 and 66, which continuously extend in the radial direction, are provided between the stator iron core 51 and the end bracket 58. The ventilating passages 65 and 66 are right-left symmetrical with respect to the center line 60. Ventilating passages 67 and 68, which provide communication between the air suction holes 61 and the fans 59 and continuously extend in the axial direction, are provided between the end brackets 58 and the fans 59. The ventilating passages 67 and 68 are formed by partitioning spaces between the stator iron core 51 and the end brackets 58 by means of cylindrical partitioning plates 69, and are right-left symmetrical with respect to the center line 60.

A ventilating passage 70, which connects the ventilating passages 65 and 66 to the ventilating passages 63b, 63d and 63f and continuously extends in the axial direction, is provided in the lower portion of the generator. A ventilating passage 71, which connects the air discharge holes 62 to the ventilating passages 63a, 63c, 63e and 63g and continuously extends in the axial direction, is also provided in the lower portion of the generator.

Coolers 72 for cooling the coolant which has been sucked from the outside of the generator are provided in the ventilating passages 63b, 63d and 63f. The coolers 72a to 72c are arranged in a lower portion of the generator in such a manner as to be aligned in a row in the axial direction. It should be noted that the coolers 72a to 72c may be arranged in an upper portion of the generator. The coolers 72a to 72c are right-left symmetrical with respect to the center line 60. A pipe line for supplying cooling water adit-a pipe line for discharging the cooling water are connected to each of the coolers 72a to 72c. The coolers 72a to 72c are identical to each other in terms of cooling capacity.

A plurality of ventilating circuits including the above-described ventilating passages are formed in the generator. A first ventilating circuit 73, a second ventilating circuit 74, and a third ventilating circuit 75 are formed on one side (left side in FIG. 13) of the center line 60, and, similarly, three ventilating circuits are formed on the other side (right side in FIG. 13) of the center line 60. The three ventilating circuits formed on the one side of the center line 60 are right-left symmetrical to the three ventilating circuits formed on the other side of the center line 60. Further, the flow of coolant and the temperature rise characteristic on the one side of the center line 60 are right-left symmetrical to those on the other side of the center line 60. Therefore, the configuration of the ventilating circuits and the flow of coolant only on the one side of the center line 60 will be described below.

The first ventilating circuit 73 is an open loop shown by a solid arrow in FIG. 13, which extends from the air suction hole 61 to the fan 59 via the ventilating passage 67, and further extends from the fan 59 to the air discharge hole 62 via the air gap 54, ventilating duct 53, ventilating passage 63a, and ventilating passage 71.

The second ventilating circuit 74 is an open loop shown by a dotted arrow in FIG. 13, which extends from the air suction hole 61 to the fan 59 via the ventilating passage 67, further extending from the fan 59 to the cooler 72a via the ventilating passages 65 and 70, and then extends from the cooler 72a to the air discharge hole 62 via the ventilating passage 63b, ventilating duct 53, air gap 54, ventilating duct 53, and ventilating passages 63c and 71.

The third ventilating circuit 75 is an open loop shown by a dotted arrow in FIG. 13, which extends from the air suction hole 61 to the fan 59 via the ventilating passage 67, further extending from the fan 59 to the cooler 72b via the ventilating passages 65 and 70, and then extends from the cooler 72b to the air discharge hole 62 via the ventilating passage 63d, ventilating duct 53, air gap 54, ventilating duct 53, and ventilating passages 63c and 71.

The flow of coolant will be described below. First, atmospheric air, which is sucked from the air suction hole 61 into the generator by rotation of the fan 59, reaches the air suction side of the fan 59 via the ventilating passage 67. The atmospheric air is boosted by the fan 59, and is allowed to flow from the discharge side of the fan 59 to respective ventilating circuits.

In the first ventilating circuit 73, the atmospheric air boosted by the fan 59 flows axially in the air gap 54 to the ventilating duct 53 communicating with the ventilating passage 63a while cooling the inner peripheral side of the stator iron core 51. The atmospheric air which has reached the ventilating duct 53 communicating with the ventilating passage 63a flows in the ventilating duct 53 from the inner peripheral side to the outer peripheral side of the stator iron core 51, that is, to the ventilating passage 63a, while cooling the inside of the stator iron core 51 and the stator coils 52. The atmospheric air which has reached the ventilating passage 18a cools the outer peripheral side of the stator iron core 51 and flows from the ventilating passage 18a to the air discharge hole 62 via the ventilating passage 71.

In the second ventilating circuit 74, the atmospheric air boosted by the fan 59 flows radially in the ventilating passage 65 to the ventilating passage 70, while cooling the end portion of the stator iron core 51 and the coil end portions of the stator coils 52. The atmospheric air which has reached the ventilating passage 70 flows axially in the ventilating passage 70 to the cooler 72*a*. The atmospheric air which has reached the cooler 72*a* is cooled by the cooler 72*a* and flows in the ventilating passage 63*b* in the peripheral direction, while cooling the outer peripheral side of the stator iron core 51, and reaches the ventilating duct 53 communicating with the ventilating passage 63*b*.

The atmospheric air which has reached the ventilating duct 53 communicating with the ventilating passage 63*b* flows in the ventilating duct 53 from the outer peripheral side to the inner peripheral side of the stator iron core 51, that is, to the air gap 54, while cooling the inside of the stator iron core 51 and the stator coils 52. The atmospheric air which has reached the air gap 54 flows axially in the air gap 54 to the ventilating duct 53 communicating with the ventilating passage 63*c*, while cooling the inner peripheral side of the stator iron core 51.

The atmospheric air having reached the ventilating duct 53 communicating with the ventilating passage 63*c* flows in the ventilating duct 53 from the inner peripheral side to the outer peripheral side of the stator iron core 51, that is, to the ventilating passage 63*c*, while cooling the inside of the stator iron core 51 and the stator coils 52. The atmospheric air which has reached the ventilating passage 63*c* cools the outer peripheral side of the stator iron core 51 and flows from the ventilating passage 63*c* to the air discharge hole 62 via the ventilating passage 71.

In the third ventilating circuit 75, the atmospheric air boosted by the fan 59 flows in the ventilating passage 65 to the ventilating passage 70 while cooling the end portion of the stator iron core 51 and the coil end portions of the stator coils 52. The atmospheric air which has reached the ventilating passage 70 flows axially in the ventilating passage 70 to the cooler 72*b*. The atmospheric air which has reached the cooler 72*b* is cooled by the cooler 72*b* and flows in the ventilating passage 63*d* in the peripheral direction, while cooling the outer peripheral side of the stator iron core 51 and reaches the ventilating duct 53 communicating with the ventilating passage 63*d*.

The atmospheric air which has reached the ventilating duct 53 communicating with the ventilating passage 63*d* flows in the ventilating duct 53 from the outer peripheral side to the inner peripheral side of the stator iron core 51, that is, to the air gap 54, while cooling the inside of the stator iron core 51 and the stator coils 52. The atmospheric air which has reached the air gap 54 flows axially in the air gap 54 to the ventilating duct 53 communicating with to the ventilating passage 63*c*, while cooling the inner peripheral side of the stator iron core 51.

The atmospheric air which has reached the ventilating duct 53 communicating with the ventilating passage 63*c* flows in the ventilating duct 53 from the inner peripheral side to the outer peripheral side of the stator iron core 51, that is, to the ventilating passage 63*c*, while cooling the inside of the stator iron core 51 and the stator coils 52. The atmospheric air which has reached the ventilating passage 63*c* cools the outer peripheral side of the stator iron core 51 and flows from the ventilating passage 63*c* to the air discharge hole 62 via the ventilating passage 71.

According to the embodiment configured as described above, the atmospheric air sucked from the outside of the generator and boosted by the fan 59 is introduced to the ventilating passage 63*d* positioned at the central portion of the stator iron core 51, being cooled by the cooler 72*b*, and is allowed to flow from the outer peripheral side to the inner peripheral side of the stator iron core 51, so that it is possible to supply the atmospheric air, which is sufficiently cooled, to the central portion of the stator iron core 51.

Accordingly, the central portion of the stator iron core 51, at which the temperature of the supplied atmospheric air tends to become highest and the amount of the supplied atmospheric air tends to become smallest, can be cooled by the atmospheric air, which is sufficiently cooled by the cooler, and thereby, local heat generation in the air gap 54 can be suppressed. This makes it possible to level the axial temperature rise distribution in the generator and hence to suppress the thermal oscillation stroke of the rotor.

(Eighth Embodiment)

Figure 14:
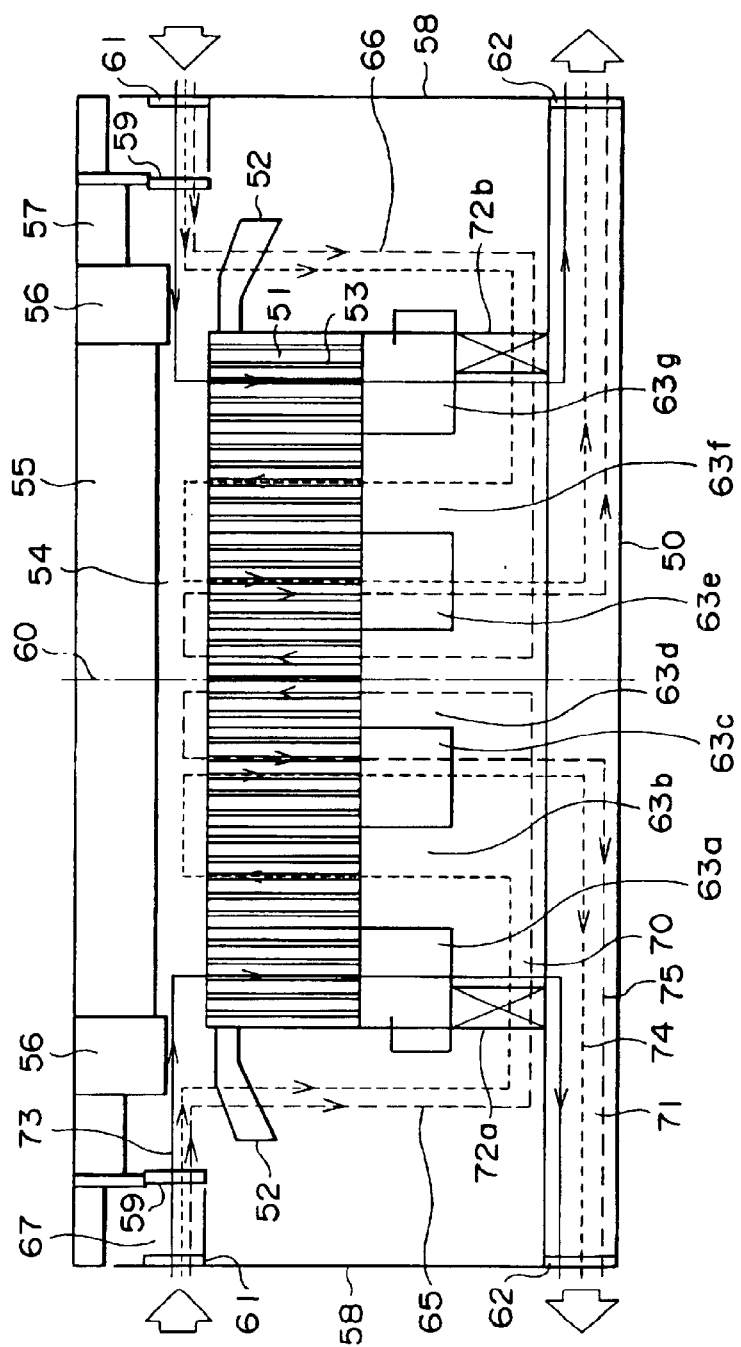
FIG. 14 is a sectional view showing the inner configuration of a portion, positioned under a rotating shaft, of a turbine generator according to an eighth embodiment of the present invention.

FIG. 14 shows a configuration of a turbine generator according to an eighth embodiment. This embodiment is a variation of the seventh embodiment. The turbine generator in this embodiment is of an open type like the seventh embodiment. In this embodiment, coolers 72*a* and 72*b* are provided at both ends of a ventilating passage 70 in such a manner as to be right-left symmetrical with respect to a center line 60. The remainder of the configuration is the same as that of the seventh embodiment, and therefore, a description thereof is omitted.

Even in this embodiment, the same effect can be obtained by providing the same ventilating circuits and flow of atmospheric air as those in the seventh embodiment, and further, since the number of the coolers is reduced by one, it is possible to simplify the configuration of the generator and hence to reduce the cost of the generator.

The present invention is applicable to a rotating electric machine in which coolers for cooling a coolant such as air or hydrogen gas are provided. In particular, the present invention is applicable to a rotating electric machine using air as a coolant, that is, an air-cooled generator, and provides an increase in the capacity of a generator, for example, of a hydrogen-cooled type.

What is claimed is:

1. A rotating electric machine comprising:
   a plurality of annular ventilating passages formed between a stator frame and a stator iron core and arranged in parallel to one another in an axial direction of the stator iron core, each of the plurality of annular ventilating passages being provided for a respective portion of said stator iron core and surrounding and communicating with an outer periphery thereof;
   a rotor iron core defining an air gap with an inner periphery of said stator iron core;
   a rotating shaft formed integral with said rotor iron core and extending in the axial direction thereof;
   a pair of boosters, a respective one of said pair of boosters being disposed on said rotating shaft and proximate to an end thereof, for boosting a coolant and causing the coolant to flow inward of the rotating electric machine;
   a plurality of coolers for cooling the boosted coolant, each of said plurality of coolers being provided for a respective one of said plurality of annular ventilating passages;
   a plurality of radially extending ventilating ducts formed in said stator iron core and being spaced from one another in the axial direction thereof, each of said plurality of radially extending ventilating ducts permitting the boosted coolant to flow in radial direction through said stator iron core; and a ventilating circuit which allows the coolant boosted by one of said pair of boosters to flow through the cooler for said annular ventilating passage for a center portion in the axial direction of said stator iron core, the center portion of said stator iron core in a direction from the outer periphery to the inner periphery thereof through the radially extending ventilation ducts therein, a part of the air gap, an adjacent portion of said stator iron core in a direction from the inner periphery to the outer periphery thereof through said radially extending ventilating ducts therein, said annular ventilating passage provided for the adjacent portion of said stator iron core and said cooler associated with said annular ventilating passage for the adjacent portion of said stator iron core to the suction side of the one of said pair of boosters.

2. A rotating electric machine according claim 1, wherein said coolers are provided in an upper or lower portion of said rotating electric machine.

3. A rotating electric machine according to claim 1, wherein axial intervals of the radially extending ventilating ducts positioned at said central portion of said stator iron core are smaller than axial intervals of the radially extending ventilating ducts positioned at the other portion of said stator iron core.

4. A rotating electric machine according to claim 1, wherein the coolant is air.

5. A rotating electric machine according to claim 1, wherein the ventilating circuit includes at least first and second different coolant ventilating circuit portions.

6. A rotating electric machine according to claim 1, wherein the coolant is cooled by one of said plurality of coolers prior to being introduced to one of said pair of boosters.

* * * * *